United States Patent [19]
Streiff et al.

[11] Patent Number: 5,766,666
[45] Date of Patent: Jun. 16, 1998

[54] PROCESS FOR PREPARING REDUCED FAT AND FAT FREE SWEETENED CONDENSED MILK

[75] Inventors: Paul Joseph Streiff, Camillus; William Edward Lannigan, Port Byron; Anthony John Irwin, Baldwinsville, all of N.Y.; Jerry Arlen Wright, Wellsboro, Pa.; Travis Daniel Vernon, Starkville, Miss.

[73] Assignee: Borden Foods Corporation, Columbus, Ohio

[21] Appl. No.: 348,908

[22] Filed: Nov. 25, 1994

[51] Int. Cl.$^6$ .................................................. A23C 9/00
[52] U.S. Cl. .................. 426/587; 426/491; 426/519; 426/522; 426/580; 426/804
[58] Field of Search .................. 426/580, 587, 426/519, 522, 804, 491

[56] References Cited

U.S. PATENT DOCUMENTS

| | | | |
|---|---|---|---|
| 2,565,085 | 8/1951 | Peebles | 426/587 |
| 2,570,231 | 10/1951 | Hansen | 426/330.2 |
| 3,108,875 | 10/1963 | Bell | 426/658 |
| 4,091,118 | 5/1978 | de Pham | 426/587 |
| 4,362,756 | 12/1982 | Williams | 426/587 |
| 5,223,299 | 6/1993 | Dalan et al. | 426/587 |
| 5,229,159 | 7/1993 | Schwan | 426/587 |
| 5,260,079 | 11/1993 | Zetlier et al. | 426/491 |

OTHER PUBLICATIONS

Wong et al., "Fundamentals of Dairy Chemistry", pp. 55–56, Jan. 1988.

Kirk–Othmer *Encyclopedia of Chemical Technology*, vol. 13, (1967), pp. 553–556.

Condensed Milk and Milk Powder, Otto Hunziker, (1950), Chapter XIV ("Forewarming and Addition of Sugar"), pp.168–183; Chapter XV (Condensing the Milk), pp. 184–191; Chapter XIX (Manufacture of Evaporated Milk), pp. 222–232; Chapter XXI (Irradiation, Fortification, Homogenization), pp. 238–257; Chapter XXIV (Factors that Influence the Marketable Properties of Evaporated Milk), pp. 275–285.

Newstead, David F., et al. *J. Dairy Research*, 46, 17 (1979), "Studies on the induction of heat stability in evaporated milk by preheating: effects of milk concentration, homogenization and whey proteins".

*Primary Examiner*—Lien Tran
*Attorney, Agent, or Firm*—Watson Cole; Stevens Davis, P.L.L.C.

[57] ABSTRACT

Producing reduced fat sweetened condensed milk includes, inter alia heating steps to denature whey protein to control age thickening of these products, process steps to include heating a reduced fat starting milk product or the skim portion of the starting milk product prior to the addition of sweetener. Producing a fat free product includes, inter alia, the same heating steps as described above. The starting material for producing the fat free product however, is a fat free starting product.

17 Claims, 2 Drawing Sheets

PROCESS FOR PREPARING REDUCED FAT AND FAT FREE SWEETENED CONDENSED MILK

FIELD OF THE INVENTION

This invention relates to low fat and fat free sweetened condensed milk products and processes for preparing such products.

BACKGROUND OF THE INVENTION

Sweetened condensed milk is a Federally standardized food product (standardized product), obtained by partial removal of water from a mixture of milk and the addition of a carbohydrate sweetener. The standard product has long been used in the bakery and confectionery trades, and it has a prescribed milk fat content of not less than 8.0%, not less than 28% total milk solids, and sufficient sweetener, e.g., sucrose, to give a solution having an osmotic pressure sufficiently high enough to prevent the growth of microorganisms which would cause product spoilage, i.e. approximately 61.0–64.0% sugar solids in the water phase.

The basic processing techniques for production of sweetened condensed milk are shown, for example, in the description of sweetened condensed milk technology in the 1967 Kirk-Othmer, *Encyclopedia of Chemical Technology*, Vol. 13 at pages 553–556 (herein incorporated by reference). Briefly, the sweetener, e.g., in a syrup form, can be added to raw milk in storage or to warmed milk in a hot well. The sweetened milk is subjected to forewarning to control viscosity and age thickening in the finished product and heat stability prior to pasteurization. The sweetened milk may also be pasteurized at sufficient temperature and time to destroy all enzymes and most microorganisms. The heated sweetened milk is concentrated to the desired total solids level and it then may also be homogenized (see U.S. Pat. No. 4,362,756, herein incorporated by reference), cooled, seeded with lactose and then delivered to agitated storage for subsequent packaging. The primary purpose of homogenization after sweetening is to prevent objectionable fat separation after manufacture.

Sweetened condensed milk produced according to the prevailing practice is a good product which is consumed in the baking and confectionery industries and also by retail consumers in great quantities. However, the age thickening of this product during shipment and storage prior to sale is still a constant threat to the marketability of this product. The age thickening of sweetened condensed skim milk must be distinguished from fat separation and is caused by the presence and transformation of proteins contained in the product and generally occurs within weeks of packaging and up to fifteen months of storage. The reduction of fat or the removal of fat exacerbates or accelerates the age-thickening problem due to high protein content in proportion to the total milk solids content and the lack of fat available for interfering or inhibiting the interaction of protein with the other milk constituents, namely the carbohydrates (lactose and sucrose), minerals and water.

The problem of age thickening is not completely solved in the standardized full fat sweetened condensed milk product and no solution is known for dealing with the challenge of preventing age-thickening in reduced fat products (as such products are novel to the industry) or in fat free products.

The present invention is directed to processes addressing the age-thickening problem of reduced fat and no-fat products.

BRIEF SUMMARY OF THE INVENTION

The invention relates to reduced fat or fat free sweetened condensed milk compositions and products containing the same.

The invention for producing reduced fat sweetened condensed milk includes, inter alia heating steps to denature whey protein to control age thickening of these products, process steps to include heating a reduced fat starting milk product or the skim portion of the starting milk product prior to the addition of sweetener.

The invention for producing a fat free product includes, inter alica, the same heating steps as described above. The starting material for producing the fat free product however, is a fat free starting product.

DETAILED DESCRIPTION OF THE INVENTION

Figure 1:
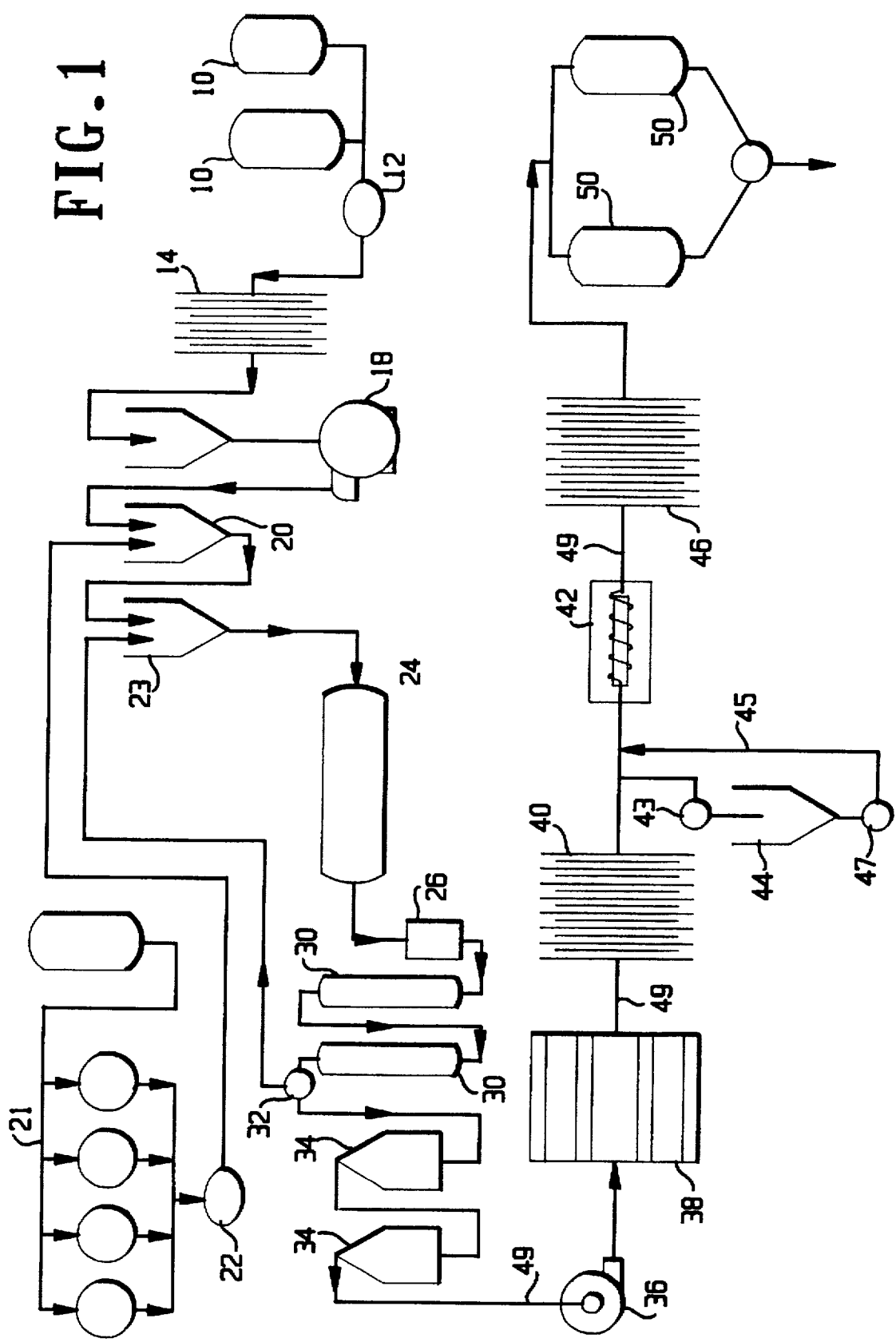
FIG. 1 is a schematic diagram of the process steps of an embodiment of the invention.

The production of fat free and/or reduced fat sweetened condensed milk involves producing a fat free or reduced fat raw milk starting material. This may involve blending one or more of the following dairy ingredients: whole milk, low fat milk, skim milk or cream, or centrifugal separation of whole milk to produce skim milk or reduced fat milk.

The inventors have found that a quality storage stable reduced fat product having good age thickening characteristics can be produced in accordance with the invention by producing a reduced fat milk product which is preheated, homogenized, then sweetened and then condensed.

The phrase "fat free" as mentioned pertains to a finished product having less than 0.5 grams of fat per serving size (two tablespoons) while meeting the Federal standards for a sweetened condensed skim milk (milk fat of less than 0.50% and a minimum total milk solids of 24.00%.)

The phrase reduced fat products as used herein may be generic for the phrase "low fat" which refers to a product having 50% of its fat removed relative to the standardized product, or may also refer generically or specifically to a "reduced fat" product having 33% of its fat removed relative to the standardized product.

Low fat (50% reduced fat product), 33% reduced fat product and fat free products of the invention, are compared to a standard sweetened condensed milk composition as shown in Table I.

TABLE I

SWEETENED CONDENSED MILK COMPOSITIONS

| MILK | Standardized Full Fat | ~33% Reduced Fat | ~50% Low Fat | Fat Free |
|---|---|---|---|---|
| % Fat | 8.25% | 5.25% | 3.90% | <0.50% |
| Total Fat/Serving | 3 g | 2 g | 2 g | 0 g |
| Calories/Serving | 130 | 125 | 120 | 115 |
| Fat Calories/Serving | 30 | 20 | 15 | 0 |
| % Calories from Fat/Per Serving | 23% | 16% | 13% | 0 |
| Milk Solids Non-Fat | 19.75% | 19.75% | 19.75% | 24.00% |
| Total Milk Solids | 28.00% | 25.00% | 23.65% | 24.25% (±0.25%) |
| Sugar Solids | 45.35% | 47.25% | 48.10% | 48.00% |
| Total Solids | 73.35% | 72.25% | 71.75% | 72.25% (±0.25%) |
| MSNF/Fat Ratio | 2.394 | 3.762 | 5.064 | 96.000 |
| Sugar/Fat Ratio | 5.497 | 9.000 | 12.333 | 192.000 |

TABLE I-continued

SWEETENED CONDENSED MILK COMPOSITIONS

| MILK | Standard-ized Full Fat | ~33% Reduced Fat | ~50% Low Fat | Fat Free |
|---|---|---|---|---|
| Sugar Solids (Sucrose) | 45.35% | 47.25% | 48.10% | 48.00% |
| Sugar/Sugar + Water Content | 63.00% | 63.00% | 63.00% | 63.35% |

Age thickening of Federally standardized sweetened condensed milk compositions is currently controlled (at least for a period of 12–15 months) by forewarming the milk product just prior to condensing. However, the present inventors have determined that age thickening of reduced fat, low fat and no fat compositions cannot be sufficiently controlled by mere forewarming.

It is pointed out that low fat, reduced fat and fat free sweetened condensed milk production is still very much an art rather than a science, and the inventors have conducted many trials leading to the present invention.

In a first embodiment of the invention a raw milk product is produced which is then subjected to additional processing necessary to produce the sweetened condensed product. Preferable, the raw milk product is a low fat milk produced as follows:

Fluid whole milk containing approximately 3.50% fat is separated into cream containing 36% milk fat and fluid skim milk containing 0.20% milk fat. A portion of the separated cream is then recombined with the skim milk producing a product having 10–11% total solids. To produce a final product having 50% reduced fat, a starting milk product is produced by combining one part by volume of 36% fat cream with 22 parts by volume of skim milk containing 0.20% milk fat. This raw milk product contains approximately 1.70% milk fat.

To produce a final product having 33% reduced fat, a starting milk product is produced by combining one part by volume of 36% fat cream is combined with 15.5 parts by volume of skim milk containing 0.20% milk fat. This raw milk starting material contains about 2.30% milk fat. In any event such starting products should contain less than 2.50% fat, preferably less than 2.00% fat, and ideally between 1.50 and 1.70% milk fat.

The inventors have determined that the starting milk product must be heated at specific temperatures for specific times in order to reduce levels of undenatured whey protein per gram of MSNF to a desirable level. Generally, it is known to those of skill in the art that certain heat treatments of raw milk will produce milk products with certain amounts of undenatured whey protein remaining in the heated product. Previous research indicates time and temperatures required for various degrees of denaturation of whey protein has been conducted. The present inventors have discovered that homogenization, prior to the addition of sugar, and the presence of an optimal amount of undenatured whey protein combine to produce low fat and reduced fat sweetened condensed milk products of good viscosity with improved age thickening characteristics.

For instance, the inventors have found that conducting heat treatments of the raw milk product at temperatures of 160° to 190° F. for ten to twenty minutes produces an ideal milk starting product. Over this temperature range products containing less than 1.5 mg undenatured WPN (whey protein nitrogen) per gram of MSNF, products containing greater than 6 mg undenatured WPN per gram MSNF and products in between this range can be obtained. The inventors have realized that only by treating a raw milk product in these optimum time and temperature ranges can an acceptable final sweetened condensed milk product be produced.

When a product containing greater than 6 mg of undenatured WPN per 1 gram of MSNF is desired the raw milk product must be subjected to a low temperature heating step of about 160° F. for 10–20 minutes. If a product containing undenatured WPN of less than 1.5 mg per gram of MSNF is desired, then the raw milk product must be subjected to a high temperature heating step of about 190° F. for 10–20 minutes. If undenatured whey protein nitrogen concentrations of between 1.5 mg per gram of MSNF and 6 mg WPN per gram of MSNF are desired, the raw milk product must be heated at temperatures of about 175° F. for 10–20 minutes. These temperatures and times have been determined by the inventors as optimum conditions for treating the raw milk so as to obtain a final product having a good viscosity and good age thickening characteristics. If these conditions are not followed, one may produce a product with a good final viscosity, but the product may gel, i.e., age thicken in a period of one to two months.

After the low fat milk is subjected to the heating conditions described above, it is then condensed to a 3 times to 3.5 times concentration (to produce a product having 30 to 35% total solids) in a standard vacuum evaporator. This obtained product is referred to as concentrated low fat milk. The concentrated low fat milk may be cooled and stored in milk silos 10, as shown in FIG. 1, and pumped in a continuous process through milk meter 12, and then through plate heater 14 which raises the milk concentrate temperature from less than 45° F. to a range of 120° to 130° F. The product is then conveyed into hot well or surge tank 16. From here the milk is treated to the homogenization step of the invention in homogenizer 18. Homogenizer 18 may be a single stage homogenizer or a double-stage homogenizer. It is hypothesized that homogenizer 18 not only subdivides and greatly increases the number of fat globules contained in the milk and decreases their particle size, but homogenization increases the viscosity of evaporated milk and possibly further assists in stabilizing the physical emulsion by altering the nature of the protein-lipid interaction in the milk. Homogenization is conducted at pressures of between about 800 psi to 2500 psi. In two-stage homogenization the second stage is set at 10% of the first stage. Accordingly, if homogenization is to be conducted at 1650 psi, the first stage homogenization is conducted at 1500 psi, and the second stage is conducted at 150 psi. At this time it is preferred to conduct two stage homogenization at a total pressure of 1650 psi. The homogenized product is then subjected to the remaining steps leading to a sweetened condensed milk product.

From homogenizer 18, homogenate is passed to hot well or surge tank 20 where it receives a sugar syump solution which is 67% sugar (cane or beet sugar solution) stored in system 21 and metered through valve 22. It is also possible to add granulated sugar rather than the sucrose solution. Sugar is added, as is known in the art, to preserve the condensed milk without resorting to sterilization by heat. A sugar/sugar and water content of 62.50% will serve this purpose. A vitamin A emulsion is metered into the product for fortification. The standardized full fat and skim product (fat free) does not contain added Vitamin A. However, the reduced fat product of the invention is not standardized.

Thus Vitamin A can be added to fortify such a product. The vitamin A composition is a light amber colored, pourable liquid emulsion of water, corn oil, propylene glycol, vitamin A palmitate and glyceryl monooleate. Vitamin A is present in the emulsion as 100,000 I.U. per milliliter. It is preferable to add the vitamin A in small incremental amounts over the course of the production and just prior to homogenization or forewarming to assure proper blending into the final low fat sweetened condensed milk product; however, vitamin A can be introduced at any step of the process, as its addition is not critical and does not appear to alter desired results.

From hot well 20 the milk/sugar/vitamin blend is pumped into hot well or surge tank 23. Hot well 23 is equipped with an agitator (not shown) to ensure a mixed product.

The mixed product is passed through a tubular heater 24 where the mixed product is heated to a temperature of 180° F.

To ensure satisfactory operation of the vacuum pan and condensing steps of the process and to assure the product is adequately pasteurized, the mixed product must enter the evaporators at a temperarure at or above the operating temperature of such equipment. Therefore it must be heated. This is necessary to ensure uninterrupted boiling, maximum rapidity of evaporation, freedom from heat damage to the milk and optimum microbiological quality. This heating is known as forewarming. It is through forewarming that the viscosity of the final product is greatly influenced.

The product exits tubular heater 24 and passes through a direct steam infusion heater 26 where the milk/sugar blend is heated to a range of 210°–240° F. with direct steam, preferably to about 225° F. The viscosity of the product is adjusted by the steam heating. By this heating temperature a desired viscosity of 1,000–4,000 cps or 1,200–2,800 cps, preferably 2,000–3,000 cps, is achieved as measured by a Brookfield viscometer.

From the infusion heater 26 the viscosity-adjusted milk product is passed into holding tubes 30. The product is held for as long as it takes to fill the tube. Once filled, the product is passed through a flow diversion valve 32 which either releases product to a vacuum pan or diverts product back to sugar/milk hot well 23 if the product temperature is less than 200° F.

If product is at 200° F., then the milk/sugar product is drawn by a vacuum, 15–27 inches, into first and second effects 34. First or second effects are vacuum pans and may be falling film evaporators or rising film evaporators. Here the product is condensed to its final solid content of 72% solids and is generally concentrated to 1.5 to 3.0 times or more of its starting formulation or if the starting formulation includes concentrated skim in the blend it is concentrated to 1.5 to 2.0 times. The solids content can be directly or indirectly determined for example by use of a Brookfield viscometer, Baume testing, and fat/solids testing (Mojonnier Tester).

The product is extracted from the pans via positive pressure pump 36 and through four-inch ladish filters 38 wherein micro-impurities, sugar crystals, etc., are filtered from the solution.

From the filter bank 38, the solution is cooled to about 80°–90° F. in a first plate cooler 40. From there product is directed to a screw agitator 42. A lactose/sweetened condensed low fat milk dispersion is added through line 45 and finely dispersed to the concentrated sweetened condensed reduced fat milk as is known in the art. The dispersion is created by diverting a portion of the product from plate cooler through two-way valve 43 into lactose seed tank 44.

The dispersion is added back to main line 49 through line 45 via pump 47. As is known, the sweetened condensed milk is seeded with finely dispersed lactose crystals to ensure that a uniform mixture is obtained having relatively small lactose crystals. Thereafter the solution is preferably directed to a second plate cooler 46 and is cooled to 65°–75° F., before discharge into sterile holding tanks 50 prior to final packaging.

Manufacturing procedures will vary with the season of the year and degree of concentration; therefore, products (low fat and reduced fat) are specified as having a range of ingredients:

| | |
|---|---|
| Fat | 3.90–5.25% |
| MSNF | 19.75–22.00% |
| TMS | 23.65–25.90% |
| Sugar | 46.70–48.10%* |
| Sugar/Sugar plus Water content | 62.50–64.00% |
| TS | 71.75–73.10% |
| MSNF/FAT Ratio | 3.762–5.641 |
| Sugar/FAT Ratio | 9.000–12.333 |

*but must meet required and specified s/w ratio.
Product Characteristics Product Specifications

| | |
|---|---|
| Body | Medium to Heavy after 14 days at 90° F. |
| Total plate count | Less than 500 per gram |
| Yeast and mold | Less than 10 per gram |
| Coagulation test | Negative in 100 grams |
| Coliform test | Less than 10 per gram |
| Net weight | 14.25 ounces (minimum) |
| Weight per gal. | 33% reduced fat (11.06 lbs.) 50% reduced fat (11.13 lbs.) |
| Color | Light cream |
| Sediment | Satisfactory |
| Flavor | Satisfactory |
| Sugar crystals | Small and evenly dispersed/product not grainy |
| Viscosity | 1000–4000 centipoise at 24 hours |
| Water activity | 0.84–0.86 |
| Vitamin A | Fortify at 170,250 I.U. per 100 lbs |

In another embodiment of the invention fluid skim milk or non fat milk (less than 0.50% fat) is subjected to a heat treatment of 160° F. for 10–20 minutes and then concentrated by vacuum evaporation to produce a low heat concentrated skim milk product containing 6 mg undenatured whey protein nitrogen per gram of MSNF. The low heat concentrated skim milk is then heated to a temperature of 120°–130° F. and homogenized at a pressure 1650 PSI. Next fluid whole milk (BF=3.86% and MSNF=8.60%) and the homogenized low heat concentrated skim milk (BF=0.28%, MSNF=36.08%) are blended at weight ratio range of about 3.0 to 3.2 to meet target compositions for the finished products. The starting blend should have the following MSNF:FAT ratio: 5.064. If needed, and if the ratio is less than 5.064, the milk solids non-fat must be increased. If greater than 5.064, the milk fat solids must be increased. When necessary, in order to further adjust the MSNF:FAT ratio of the starting milk supplies, either cream, fluid concentrated milk or reconstituted non-fat dry milk may be added in necessary quantities.

Figure 2:
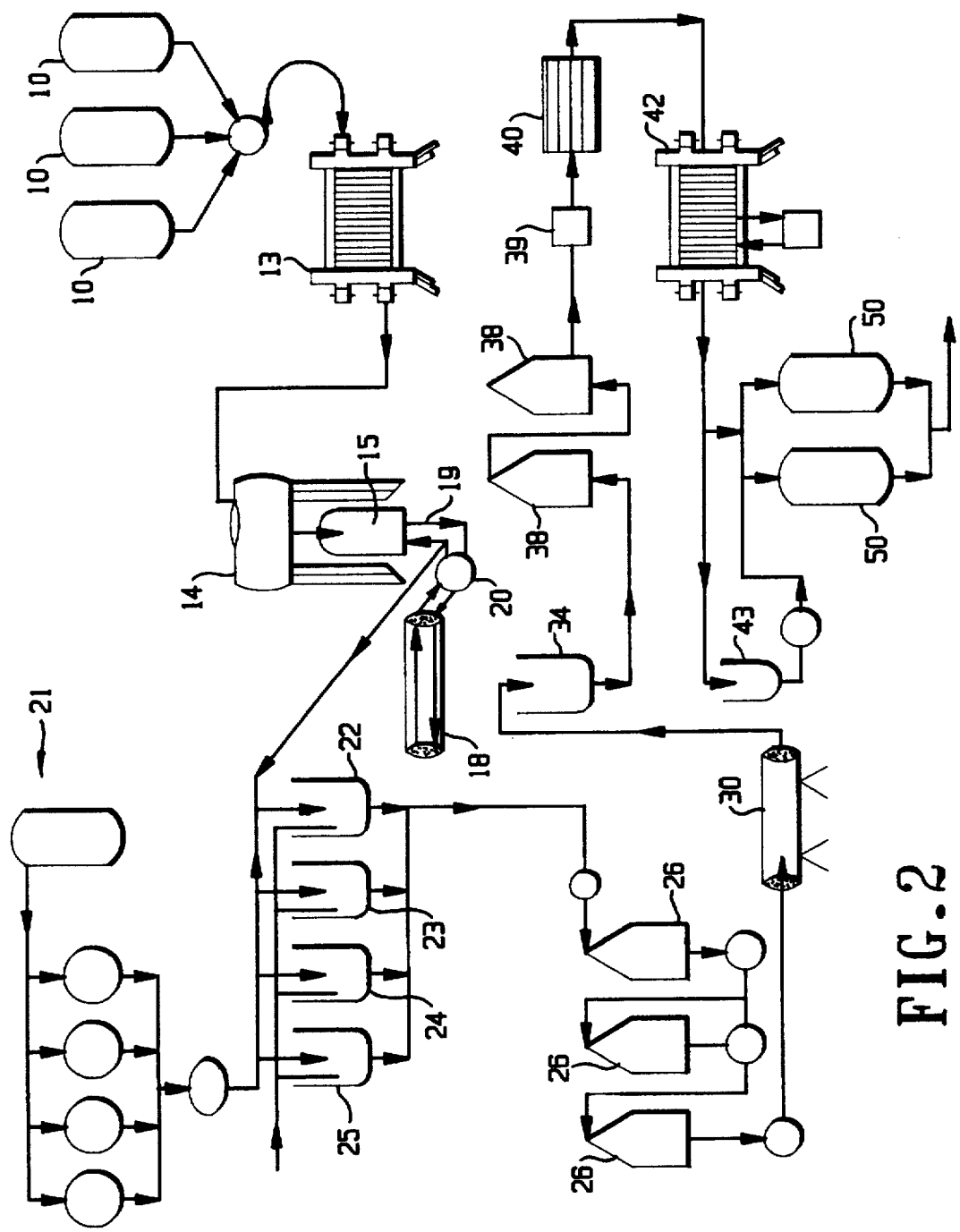
FIG. 2 is a schematic diagram of the process steps (of another embodiment of the invention.

As shown in FIG. 2, the blended/adjusted milk is stored in raw milk silos 10. Production of low fat sweetened condensed milk begins by pumping 6620 lbs of low fat concentrated milk to weigh tank 14. Optionally and immediately prior to being passed to the weigh tank 14 the milk may also pass through an Alpha-Laval plate heat exchanger 13 is to raise the temperature from 45° F. to about 75°–100° F.

Optionally warmed product, which may have been passed through heat exchanger 13, is then dropped to a circulating well 15 where it is circulated between well 15 and tubular heater 18 via pump 20 and circulating lines 19. In circulating between well 15 and the tubular heater the milk is warmed to about between 165°–180° F. Upon demand the warmed low fat milk blend is diverted to one of four hot wells 22, 23, 24, 25 where liquid sugar is being metered and supplied from sugar storage facilities 21. 6620 pounds of low fat milk blend as previously described per hot well will require 324 gallons liquid sugar per hot well. The sugar/milk mixture is then forewarmed for about 15 minutes to 190°–210° F. so that a target finished product viscosity of a range of 1000–4000 centipoise is reached. The hot well temperature is preferably seasonally adjusted to ensure viscosity integrity of the finished product. A vitamin A emulsion may also be optionally added during this holding. It is best to add the vitamin A in small incremental amounts over the length of the run to assure proper blending into the complete batch. After the holding time, the mixture which is at 22%–23% total solids is passed through a triple effect falling film evaporator 26 at 55,000 lbs/hour to concentrate the solids, so that the solution has total solids content of 45–50%.

In being concentrated by evaporation the product, as discussed in the embodiment, supra, loses heat. Therefore, the product is pumped to tubular heater 30 where the temperature of the condensed milk is again raised to 200°–210° .F and thereafter is transferred to a holding hot well 34 capable of maintaining the condensed milk between 200°–210° F. On demand, the milk is drawn from the hot well to the double effect rising film evaporator 38 for finishing the milk to a desired concentration of 71–73% total solids. As concentrated product exits the double effect evaporator, it is pumped through four inch-line ladish filters 40 via pump 39 with filters capable of removing particles greater than 500 microns in size. Product then passes through an APV plate cooler 42, cooling the product to 70°–80° F.

Approximately one hour into production a 400 gallon lactose tank 43 is ⅔ filled with finished product, which product has passed through cooler 42 en route to finished product tanks or silos 50. Product temperature is approximately less than 80° F. Crystallization of a day's production is induced by adding 0.06% of seed lactose by weight of finished product to 400 gallon tank 43. The lactose slurry is mixed in tank 43 for approximately one-half hour before it is pumped back into the system on the discharge side of the plate cooler 42.

Finished product is stored in one of two 20,000 gallon silos 50 or horizontal storage vessels (not shown) equipped with refrigeration and agitation means. The product is here cooled to 65°–75° F. and agitated for 2–4 hours. Thereafter, agitation is ceased to allow for proper sugar crystal formation. Crystal formation is complete in 8–12 hours.

Upon completion the product is cooled to 65°–75° F. The low fat product has the following preferred composition:

| Component | % By Weight |
|---|---|
| Milk fat | 3.90 |
| Milk solids non-fat | 19.75–22.00% |
| Total milk solids | 23.65–25.90% |
| Sugar solids | 46.70–48.10 |
| Total solids | 71.75–72.60% |

MSNF:FAT Ratio=5.064 to 5.641
Sugar: FAT Ratio=11.974 to 12.333
Sugar/Sugar Water Content=63.00%

It has been found that a fat free product having good age thickening properties can be obtained by using a starting milk product containing less than 0.50% fat and having a minimum MSNF:FAT ratio of 49. As described above, such a starting milk product can be obtained, for instance, by the centrifugal separation of whole milk. By using such a starting material, and by following the a majority of procedural steps discussed above, a preferred composition of the following characteristics can be obtained:

| Component | % by Weight |
|---|---|
| Milk fat | <0.50% |
| Milk solids non-fat | 24.00% |
| Total milk solids | 24.00%+ |
| Sugar solids | 48.00% |
| Total solids | 72.00%+ |

MSNF:FAT Ratio=49.000 minimium
Sugar:FAT Ratio=98.000 to 480.000
Sugar/Sugar and Water Content=63.35%.

Specifically, in producing a fat free product every step of the two procedures described above can be followed except for the homogenization step. Accordingly, the process steps most influencing the age thickening characteristics of the fat free product is the process step of determining the quantity of undenatured WPN desired in the starting milk product and conducting heat treatments as disclosed above. Heat treated fat free fluid milk can then be processed according to the steps above (excluding the homogenization step) or it can be precondensed to about 30% solids prior to the addition of sugar.

In having disclosed the preferred embodiments of the invention, obvious modifications thereof will become apparent to those of ordinary skill in the related food arts. The invention, therefore, is only limited in scope by the proper interpretation of the appended claims.

What is claimed is:

1. A method for producing a reduced fat sweetened condensed milk product, which comprises:
   preparing a reduced fat milk starting solution containing less than 2.50% milk fat; heating the reduced fat milk for ten to twenty minutes at a temperature of about 160°–190° F. to produce a heated product;
   homogenizing said heated product prior to the addition of sweetener to produce a homogenized composition;
   adding sweetener to said homogenized composition to produce a sweetened composition and condensing said sweetened composition to produce said reduced fat sweetened condensed milk product.

2. The method of claim 1 wherein the reduced milk fat starting solution is prepared by the steps comprising centrifuging fluid whole milk and recovering a fat portion and a skim portion and combining a volume portion of said fat portion with a volume majority of said skim portion.

3. The method of claim 1 wherein the reduced milk fat starting solution is obtained by blending a volume portion of whole milk with a volume majority portion of skim milk.

4. The method of claim 1 wherein the reduced milk fat starting solution contains 1.50–1.70% milk fat.

5. The method of claim 1 further comprising adding Vitamin A to the reduced fat milk solution prior to the homogenization step.

6. The method of claim 1 wherein the reduced fat starting solution is heated at a temperature of about 160° F. for ten to twenty minutes.

7. The method of claim 1 wherein the reduced fat starting solution is heated at a temperature of about 190° F. for ten to twenty minutes.

8. The method of claim 1 wherein the reduced fat starting solution is heated at a temperature of about 175° F. for ten to twenty minutes.

9. A method for producing a reduced fat sweetened condensed milk product comprising:

heating a skim milk portion of liquid milk for 10–20 minutes at about 160°–190° F. to produce a heated skim milk portion of liquid milk product;

homogenizing said heated skim milk portion of liquid milk product to produce a homogenized product, combining said homogenized product with fluid whole milk to produce a starting milk solution containing less than 2.50% milk fat and thereafter adding a sweetener to produce a sweetened solution, and condensing the sweetened solution to produce said reduced fat sweetened condensed milk.

10. The method of claim 9 further comprising adding Vitamin A to the starting milk solution.

11. The method of producing a reduced fat sweetened condensed milk product according to claim 9 further comprising:

concentrating the heated skim milk portion of liquid milk prior to homogenizing.

12. A method of producing a reduced fat sweetened condensed milk, comprising:

centrifuging fluid whole milk and recovering a fat portion and a skim portion and combining a volume portion of said fat portion with a volume majority of said skim portion to produce a reduced fat milk product;

heating the reduced fat milk product for ten to twenty minutes at a temperature range of about 160°–190° F. to produce a heated product, homogenizing said heated product to produce a homogenized product;

adding sweetener to the homogenized product to produce a sweetened reduced fat milk product; and condensing said sweetened reduced fat milk product to produce a concentrated reduced fat milk.

13. The method of claim 12 further comprising forewarming the sweetened reduced fat milk product prior to condensing.

14. The method of claim 13 wherein the reduced fat milk product is heated at a temperature of about 160° F. for ten to twenty minutes.

15. The method of claim 13 wherein the reduced fat milk product is heated at a temperature of about 190° F. for ten to twenty minutes.

16. The method of claim 13 wherein the reduced fat milk product is heated at a temperature of about 175° F. for ten to twenty minutes.

17. A method of producing a fat free sweetened condensed milk, comprising: heating a fat free starting milk product that has a minimum MSNF:FAT ratio of 49 for 10–20 minutes at a temperature of about 160°–190° F., to produce a heated product, homogenizing the heated product, sweetening the homogenized product, and condensing the sweetened product.

* * * * *